United States Patent
Ida

(10) Patent No.: US 8,587,633 B2
(45) Date of Patent: Nov. 19, 2013

(54) VIDEO TELEPHONE SYSTEM

(75) Inventor: Tomotaka Ida, Kumagaya (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 341 days.

(21) Appl. No.: 13/192,219

(22) Filed: Jul. 27, 2011

(65) Prior Publication Data

US 2012/0162352 A1    Jun. 28, 2012

(30) Foreign Application Priority Data

Dec. 28, 2010  (JP) .................................. 2010-293430

(51) Int. Cl.
*H04N 7/14* (2006.01)

(52) U.S. Cl.
CPC ...................................... *H04N 7/14* (2013.01)
USPC ................... 348/14.07; 348/14.01; 348/14.04

(58) Field of Classification Search
USPC .............................. 348/14.01–14.16; 725/142
See application file for complete search history.

(56) References Cited

U.S. PATENT DOCUMENTS

| | | | |
|---|---|---|---|
| 2005/0207486 A1 | 9/2005 | Lee et al. | |
| 2009/0013373 A1* | 1/2009 | Iizuka | 725/142 |
| 2010/0073455 A1* | 3/2010 | Iwabuchi et al. | 348/14.04 |

FOREIGN PATENT DOCUMENTS

| | | |
|---|---|---|
| JP | 2000-004453 | 1/2000 |
| JP | 2005-175566 | 6/2005 |
| JP | 2005-328332 | 11/2005 |
| JP | 2007-529960 | 10/2007 |

* cited by examiner

*Primary Examiner* — Melur Ramakrishnaiah
(74) *Attorney, Agent, or Firm* — Blakely, Sokoloff, Taylor & Zafman LLP

(57) ABSTRACT

According to one exemplary embodiment, a video telephone system includes: a digital broadcast receiver which receives a digital broadcast signal and reproduces a 2D or 3D video signal and an audio signal; a display unit and speakers which output the signals; a camera unit and a microphone unit for a TV phone call; a communication unit which transmits a 2D or 3D image data taken by the camera unit and an audio data picked up by the microphone unit to the outside, and which receives a 2D or 3D image data and an audio data from the outside; and a controller which receives meta-information indicating whether a counterpart TV receiver is in a 3D video displayable state, and transmits at least one of the 2D or 3D image data, the audio data, and a message to the counterpart TV receiver depending on a condition of the counterpart TV receiver.

4 Claims, 5 Drawing Sheets

VIDEO TELEPHONE SYSTEM

CROSS REFERENCE TO RELATED APPLICATION(S)

The application is based upon and claims the benefit of priority from Japanese Patent Application No. 2010-293430 filed on Dec. 28, 2010; the entire content of which are incorporated herein by reference.

FIELD

Exemplary embodiments described herein relate generally to a video telephone system which enables, using a network, a 3D TV phone call between at least two TV receivers capable of 3D display.

BACKGROUND

Among Internet TV phone services is a call service provided by Skype Technologies S.A. which utilizes P2P. This service enables free TV phone calls using personal computers with a camera throughout the world, and it is expected that its users will increase in the future.

On the other hand, digital TV broadcast capable of three-dimensional (3D) display has been started and 3D-compatible TV receivers and personal computers are now spreading. In the following, to be consistent with the term "3D," the term "two-dimensional display" (ordinary display) will be abbreviated as 2D display.

Among 3D display systems are a system in which switching is made between 2D image information and 3D image information that are transmitted from a Web server are displayed by a receiving personal computer while the manner of display is switched. Since an originating apparatus such as the Web server adds respective identifiers to 2D image information and 3D image information, a receiving apparatus such as the receiving personal computer can properly display a content in which 2D image information and 3D image information are mixed with each other while switching the manner of display efficiently.

The 3D display system of the above-mentioned related-art is based on a technology of the receiving apparatus. No consideration is given to what kind of video an originating TV receiver should send to a receiving TV receiver depending on whether or not the receiving TV receiver is in a 3D video displayable state, in providing an Internet TV phone service as mentioned above.

BRIEF DESCRIPTION OF THE DRAWINGS

Exemplary embodiments of the present invention will be described in detail based on the following figures, wherein.

DETAILED DESCRIPTION OF THE EXEMPLARY EMBODIMENTS

In general, according to one exemplary embodiment, a video telephone system is provided with: a digital broadcast receiver configured to receive a digital broadcast signal and to reproduce a 2D or 3D video signal and an audio signal from a demodulated signal of the received digital broadcast signal; a display unit and speakers configured to output the reproduced 2D or 3D video signal and the audio signal, respectively, and to serve for a TV phone call; a camera unit and a microphone unit for a TV phone call; a communication unit configured to transmit a 2D or 3D image data taken by the camera unit and an audio data picked up by the microphone unit to the outside, and to receive a 2D or 3D image data and an audio data from the outside; and a controller configured to receive meta-information indicating whether a counterpart TV receiver is in a 3D video displayable state, and to perform a control so that at least one of the 2D or 3D image data, the audio data, and a message is transmitted to the counterpart TV receiver depending on whether the counterpart TV receiver is in the 3D video displayable state, in making a TV phone call.

An exemplary embodiment will be hereinafter described in detail with reference to the drawings.

Figure 1:
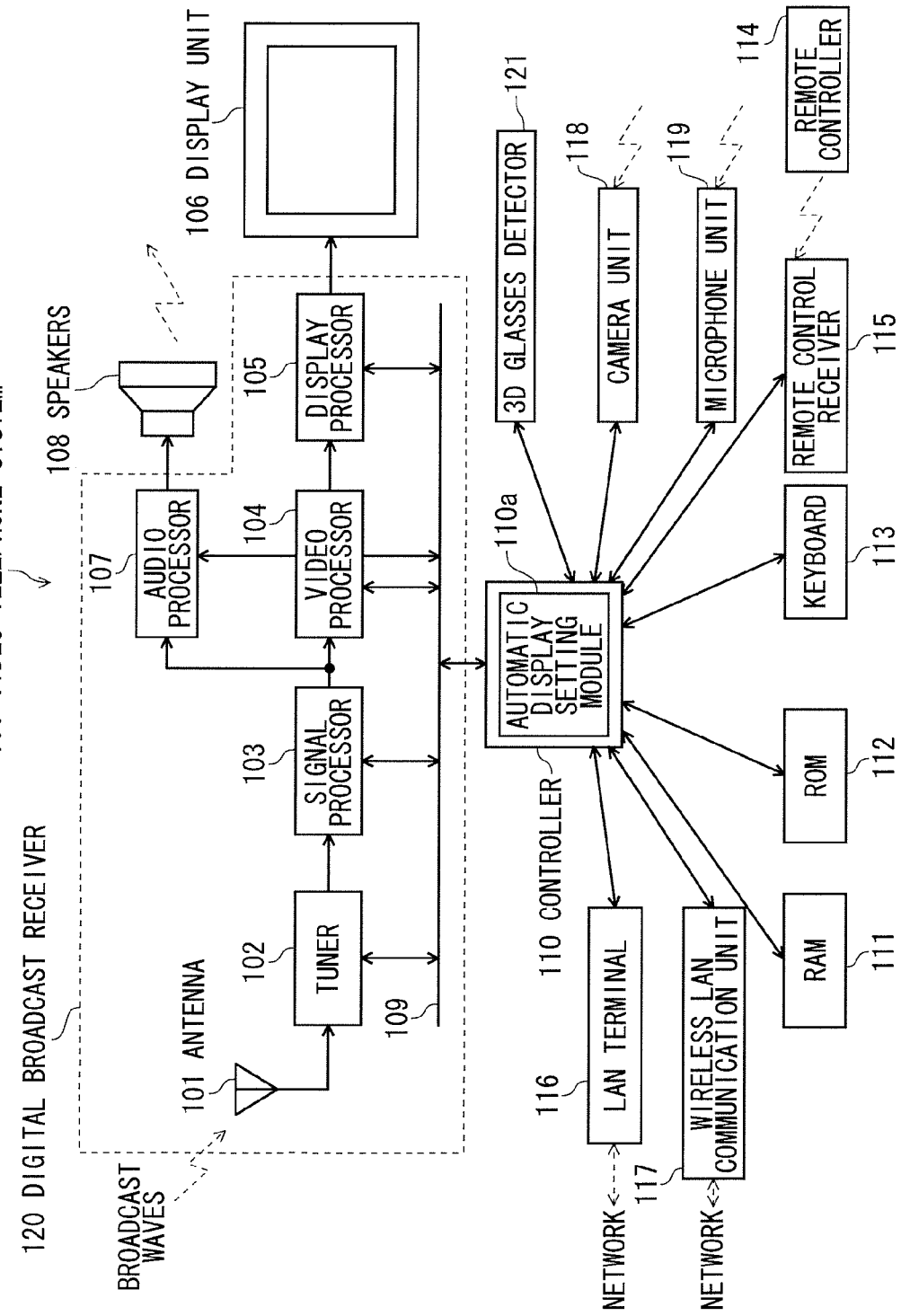
FIG. 1 is a block diagram showing a TV receiver used in a video telephone system according to an exemplary embodiment.

FIG. 1 is a block diagram showing a TV receiver used in a video telephone system according to the exemplary embodiment.

FIG. 1 shows a general configuration of a TV receiver which is one video telephone apparatus of a video telephone system which uses TV receivers incorporating a digital broadcast receiving tuner. To actually make a bidirectional TV phone call with 3D display, it is necessary that both of an originating TV receiver and a receiving TV receiver be capable of 3D display. In actuality, the TV receiver of each side may operate in such a manner as to do 2D display usually and to switch to 3D display to make a 3D TV phone call if necessary or by detecting that a reception signal is of 3D.

As shown in FIG. 1, the TV receiver of the video telephone system 100 is provided with: a digital broadcast receiver 120; a display unit 106 and speakers 108 for both of a TV phone call and TV program viewing; a camera unit 118 and a microphone unit 119 for a TV phone call; a LAN terminal 116 or a wireless LAN communication unit 117 (communication unit) for network connection; a controller 110 (e.g., CPU); a bus 109 for communication with the controller 110; a RAM 111 for data storage; a ROM 112 for program storage; a keyboard 113 for input of a text etc.; a remote controller 114 as a user interface; a remote control receiver 115; and a 3D glasses detector 121 as a glasses detector.

The digital broadcast receiver 120 is provided with: an antenna 101; a tuner 102; a signal processor 103; a video processor 104; a display processor 105; an audio processor 107; and a bus 109 which connects these components to the controller 110. The digital broadcast receiver 120 receives a digital broadcast signal and reproduces a 2D or 3D video signal and an audio signal from a demodulated signal.

The display unit 106 and the speakers 108, which serve for both of a TV phone call and TV program viewing, output the reproduced 2D or 3D video signal and audio signal, respectively.

The camera unit 118 and the microphone unit 119, which are used for a TV phone call, output left-eye and right-eye 3D signals having a parallax which are generated by two cameras and an audio signal generated by a microphone, respectively.

The LAN terminal 116 or the wireless LAN communication unit 117, which is a terminal or a wireless communication unit for connection to the Internet (not shown), transmits 2D or 3D image data and audio data supplied from the camera unit 118 and the microphone unit 119 to the outside or receives 2D or 3D image data and audio data from the outside.

The controller 110, which consists of a CPU, for example, receives meta-information indicating whether or not a receiving TV receiver (counterpart TV receiver) is a 3D-compatible TV receiver, that is, it is in a 3D video displayable state, and, in making a TV phone call, performs a control so that 2D or 3D image data and audio data or a message is sent to the counterpart TV receiver according to whether or not the counterpart TV receiver is in a 3D video displayable state.

The controller 110 is provided with an automatic display setting module 110a with which one of a setting that the display unit 106 should make 3D display, a setting that it should make 3D display, or a setting that it should make message display (neither 3D display nor 2D display is made) is made in advance. The controller 110 receives image information indicating whether or not a 3D image exists from a counterpart TV receiver, and performs a control so that a display corresponding to the setting of the automatic display setting module 110a is made if image information to the effect that a 3D image exists is received.

For example, the 3D glasses detector 121 is configured in such a manner that a light reflector is attached to 3D glasses whereas a light-emitting diode (LED) and a photodiode (PD) as a light detector are attached to the display screen side (excluding the display screen itself) of the display unit 106 of the counterpart TV receiver at a proper position. When a counterpart user has faced the display screen almost squarely (i.e., the counterpart user has been rendered in a state that is suitable for 3D viewing), light emitted from the LED is reflected by the light reflector of the 3D glasses and detected by the PD, whereby the counterpart TV receiver communicates, to the originating TV receiver, meta-information to the effect that the counterpart TV receiver has been rendered in a 3D video displayable state.

The TV receiver will be described in more detail below.

The tuner 102 tunes in to a signal on a user-specified viewing channel among digital broadcast signals such as BS, BC, ground-wave, etc. received by the antenna 101, and the signal processor 103 extracts various digital signals from a demodulated signal and processes the digital signals.

Among those digital signals, a video signal is adjusted by the video processor 104 so as to have a correct image size. Graphic information such as text information is superimposed on a resulting video signal by the display processor 105. A resulting signal is displayed on the display unit 106, and the user can thus view resulting video.

An audio signal is subjected to audio processing and amplified in the audio processor 107. Resulting signals are output as a sound by the speakers 108, and user can listen to the sound of the program being viewed.

Such devices as the tuner 102, the signal processor 103, the video processor 104, the display processor 105, and the audio processor 107 exchange data being controlled by the controller 110 via a communication line such as an IIC-BUS. The RAM 111, the ROM 112, the keyboard 113, and the remote control receiver 115 which receives a signal from the remote controller 114 are also connected to the controller 110 and exchange signals and data. The LAN terminal 116 or the wireless LAN communication unit 117, which is provided for communication with the outside, transmits and receives various data.

In addition, in the exemplary embodiment, the ROM 112 which is connected to the controller 110 is stored with 3D software which enables 3D display and communication service software of Skype, for example, which enables an Internet TV phone call. The camera unit 118 and the microphone unit 119 are provided to enable a 3D TV phone call. A configuration is provided which transmits, to the outside, via the LAN terminal 116 or the wireless LAN communication unit 117, image data taken for 3D display and audio data picked up. Image data and audio data that are transmitted from a counterpart TV receiver by a 3D TV phone call are received, and displayed on the display unit 106 and sound-output by the speakers 108.

When a receiving TV receiver (counterpart TV receiver) has detected that it is a 3D-compatible TV receiver and is in a 3D displayable state and its glasses detector 121 has detected that the counterpart user wears 3D glasses, the originating TV receiver can receive meta-information indicating those states of the counterpart TV receiver. Based on the received meta-information, the originating TV receiver starts transmitting 3D video for a TV phone call to the counterpart TV receiver. The glasses detector of the counterpart TV receiver is not limited to the 3D glasses detector 121. For example, the fact that a counterpart TV receiver has been rendered in a 3D video displayable state can be detected based on video taken by its camera unit 118.

Next, how the video telephone system 100 of FIG. 1 including the TV receiver (video telephone apparatus) will be described with reference to FIGS. 2 to 5. How a TV phone call is made will be described below.

Figure 2:
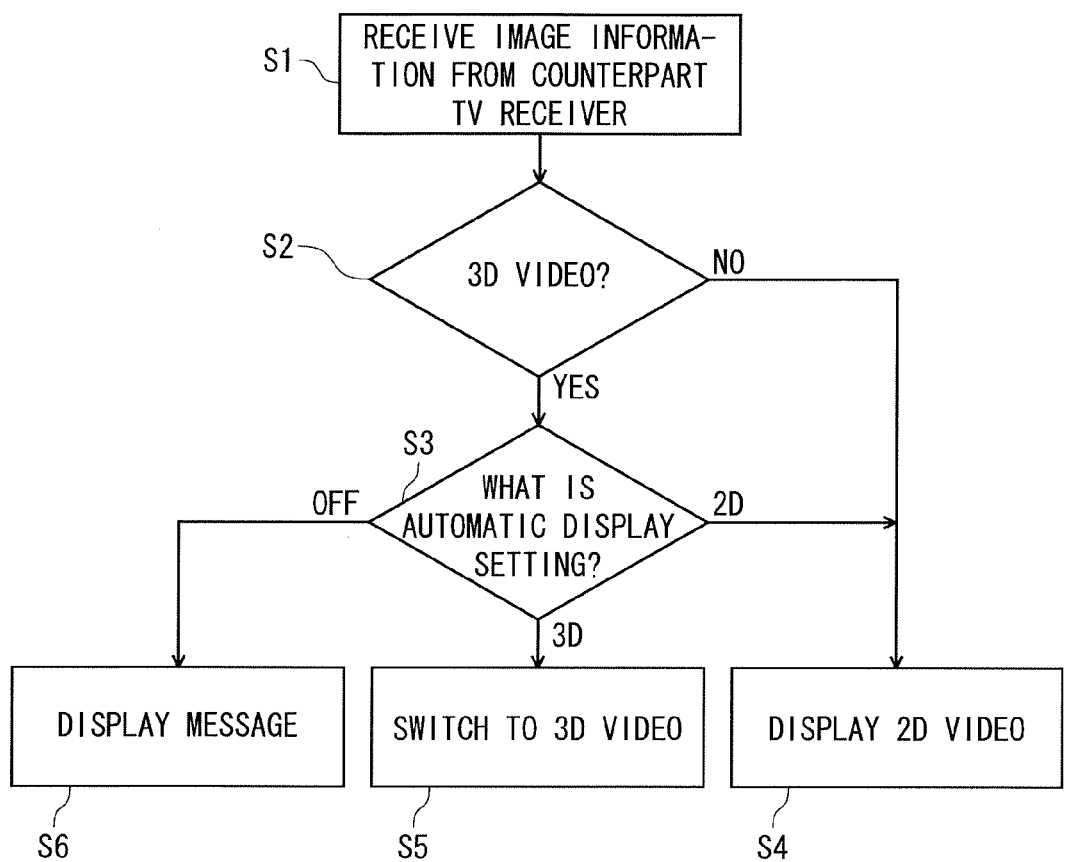
FIG. 2 is a flowchart showing an example control process which is executed by a controller shown in FIG. 1.

FIG. 2 is a flowchart showing an example control process which is executed by the controller 110. For example, this process starts when the user has pressed a call acceptance button of the remote controller 114 of the originating TV receiver in response to an incoming call from a counterpart TV receiver.

When receiving image information of a TV phone call from the counterpart TV receiver (at step S1), at step S2 the controller 110 determines whether or not it indicates that a 3D image exists. Image information to be received at step S1 is image information for a TV program (TV program itself is not included) which indicates whether or not the video transmitted from the counterpart TV receiver is 3D video. If the image information indicates that no 3D image exists (step S2: NO), the process moves to step S4, where 2D video is displayed.

On the other hand, if the image information indicates that a 3D image exists (step S2: YES), the process moves to step S3. At step S3, the controller 110 performs an automatic display setting to be made when the 3D image is input, by referring to the setting that was made in advance in the automatic display setting module 110a by the user.

How setting is made in the automatic display setting module 110a will be described below. There are three automatic display setting items to be set in advance in the automatic display setting module 110a, and one of the items is selected and set. The three automatic display setting items are "2D," "3D," and "off" (neither 3D nor 2D).

If it is determined at step S3 that 2D display should be made, the process moves to step S4, where 2D video is displayed. If it is determined at step S3 that 3D display should be made, the process moves to step S5, where switching is made to 3D video. If it is determined at step S3 that "off" is set in the automatic display setting module 110a, the process moves to step S6, where only a message is displayed.

Figure 3:
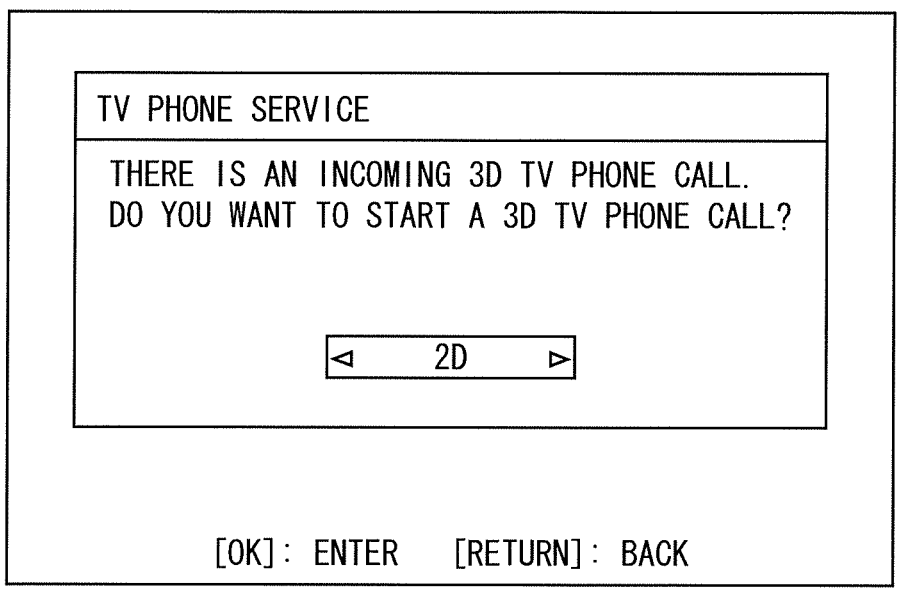
FIG. 3 shows an example message display picture which is displayed if it is determined at step S3 (see FIG. 2) that an "off" setting is made.

FIG. 3 shows an example message display picture which is displayed at step S6 ("off" setting).

In the example picture, a message "There is an incoming 3D TV phone call. Do you want to start a 3D TV phone call?" and a selection window containing an option "2D" are shown under a phrase "TV phone service." If the enter key of the remote controller 114 is pressed in the state, the message display picture is replaced by 2D video. On the other hand, another option "3D" appears if the left-hand or right-hand arrow of the selection window is pointed with the cursor. If the option "3D" is selected and the enter key of the remote controller 114 is pressed, the message display picture is replaced by 3D video. If a prescribed time has elapsed without performing any operation on the message display picture since its appearance on the display screen, the message display picture is replaced by 2D video. Therefore, if the user wants to cause display of 3D video, he or she needs to make switching to 3D display by himself or herself.

Figure 4:
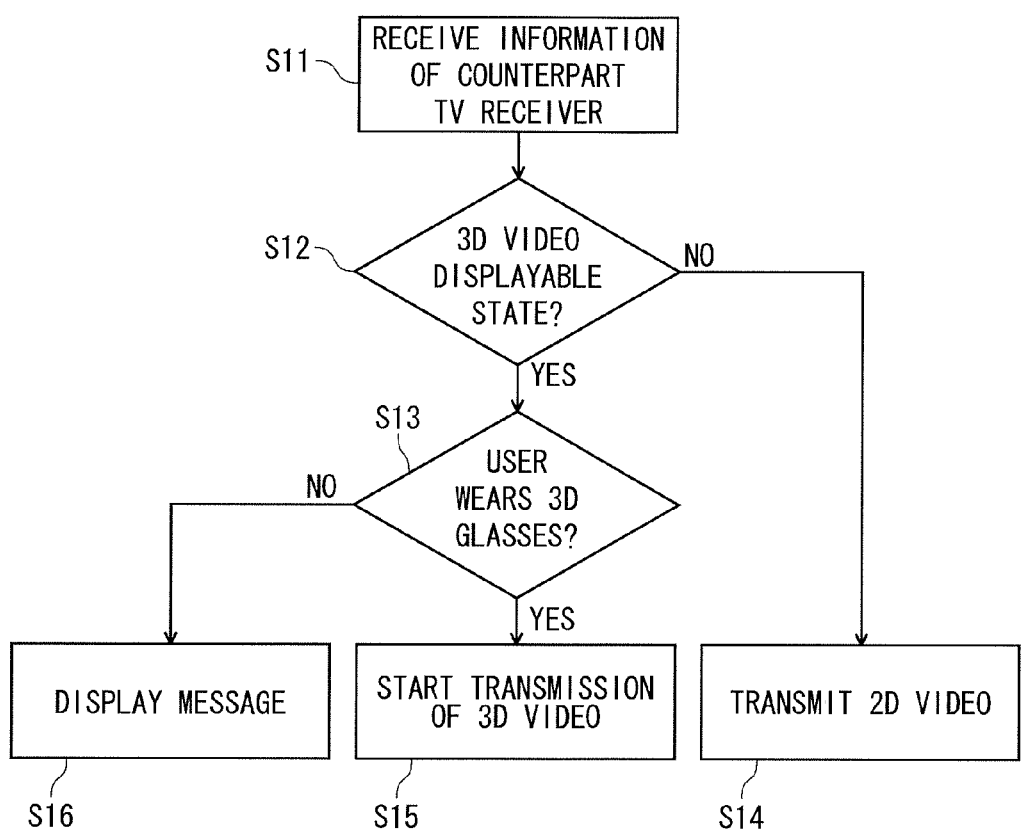
FIG. 4 is a flowchart showing another example control process which is executed by the controller.

FIG. 4 is a flowchart showing another example control process which is executed by the controller 110. For example, this process starts when the user has pressed a call origination button of the remote controller 114 of the originating TV receiver.

When receiving information of a counterpart TV receiver (step S11), at step S12 the controller 110 determines whether or not the counterpart TV receiver is in a 3D video displayable state. If the partner TV receiver is not in a 3D video displayable state (step S12: NO), the process moves to step S14, where the originating TV receiver transmits 2D video to the counterpart TV receiver. The self TV receiver transmits, to the partner TV receiver, image data taken by only one of the two cameras of the camera unit 118 and audio data picked up by the microphone unit 119.

If the controller 110 determines at step S12 that the counterpart TV receiver is in a 3D video displayable state, the process moves to step S13.

At step S13, the controller 110 determines whether or not a counterpart user wears 3D glasses based on meta-information received from the counterpart TV receiver.

If the controller 110 determines at step S13 that the counterpart user wears 3D glasses (step S13: YES), the process moves to step S15, where the controller 110 starts transmission of 3D video to the counterpart TV receiver. The originating TV receiver transmits, to the counterpart TV receiver, left-eye image data and right-eye image data taken by both cameras of the camera unit 118 and audio data picked up by the microphone unit 119.

If the controller 110 determines at step S13 that the counterpart user does not wear 3D glasses (step S13: NO), the process moves to step S16, where the controller 110 causes transmission of only message picture data to the counterpart TV receiver.

Figure 5:
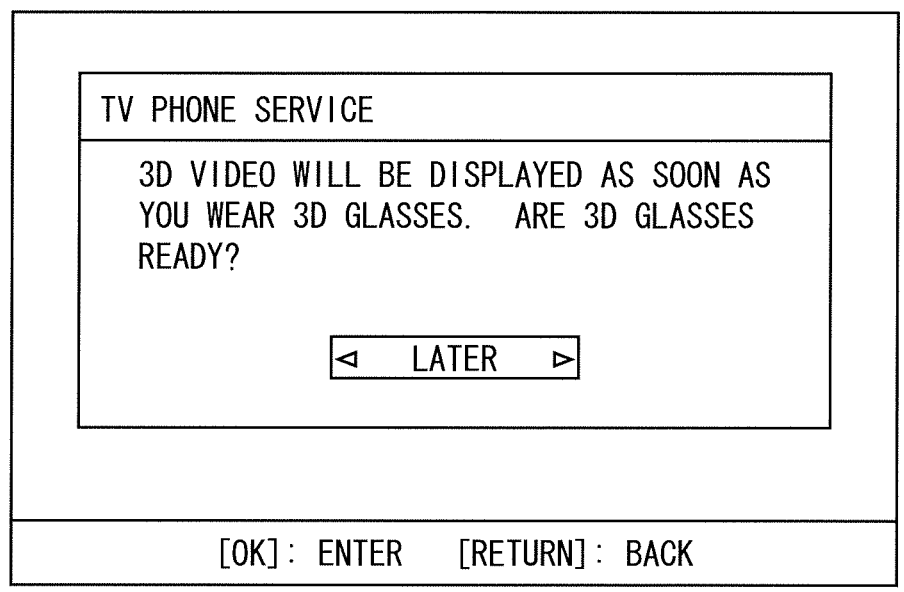
FIG. 5 shows an example message display picture whose data is transmitted to a receiving TV receiver if it is determined at step S16 (see FIG. 4) that a counterpart user does not wear 3D glasses.

FIG. 5 shows an example message display picture whose data is transmitted to the counterpart TV receiver when it is determined at step S16 that the counterpart user does not wear 3D glasses.

In the example picture, a message "3D video will be displayed as soon as you wear 3D glasses. Are 3D glasses ready?" and a selection window containing an option "Later" are displayed under a phrase "TV phone service." The option "Later" means that the counterpart user will not view 3D video for a certain reason (e.g., the user is busy, the 3D glasses are not found, or the user does not want to view 3D video for the time being). If the counterpart user presses the enter key of the remote controller 114 of the counterpart TV receiver in the state that the option "Later" is displayed or a prescribed time has elapsed with the option "Later" kept displayed, an error state is established.

If the counterpart user looks at the picture of FIG. 5, puts on the 3D glasses at such a position as to be capable of 3D viewing, and points the left-hand or right-hand arrow of the selection window with the cursor, another option "Yes" appears. If the user selects "Yes" and presses the enter key of the remote controller 114 of the counterpart TV receiver, 3D video is transmitted from the originating TV receiver and the message display picture of FIG. 5 is replaced by 3D video in the counterpart TV receiver.

Common automatic display setting items may be used for a TV phone call and TV program viewing. Alternatively, different sets of automatic display setting items may be used for a TV phone call and TV program viewing.

The exemplary embodiment makes it possible to realize a video telephone system in which 2D or 3D video that is suitable for a counterpart TV receiver which is a receiving TV receiver can be transmitted to the counterpart TV receiver depending on its state (i.e., whether or not the counterpart TV receiver is in a 3D video displayable state), in providing an Internet TV phone service.

While certain exemplary embodiment has been described, the exemplary embodiment has been presented by way of example only, and is not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A video telephone system comprising:
   a digital broadcast receiver configured to receive a digital broadcast signal and to reproduce a 2D or 3D video signal and an audio signal from a demodulated signal of the received digital broadcast signal;
   a display unit and speakers configured to output the reproduced 2D or 3D video signal and the audio signal, respectively, and to serve for a TV phone call;
   a camera unit and a microphone unit for a TV phone call;
   a communication unit configured to transmit a 2D or 3D image data taken by the camera unit and an audio data picked up by the microphone unit to the outside, and to receive a 2D or 3D image data and an audio data from the outside; and
   a controller configured to receive meta-information indicating whether a counterpart TV receiver is in a 3D video displayable state, and to perform a control so that at least one of the 2D or 3D image data, the audio data, and a message is transmitted to the counterpart TV receiver depending on whether the counterpart TV receiver is in the 3D video displayable state, in making a TV phone call.

2. The system of claim 1,
   wherein the controller includes: an automatic display setting module configured to set in advance for selecting one of a setting that 3D video should be displayed on the display unit, a setting that 2D video should be displayed on the display unit, and only a message should be displayed without 2D or 3D video, and
   wherein the controller is configured to receive image information indicating whether a 3D image exists from the counterpart TV receiver, and to cause a display corresponding to the setting of the automatic display setting module if the image information indicates that the 3D image exists.

3. The system of claim 1, wherein when the controller receives meta-information indicating that the counterpart TV receiver is in the 3D video displayable state and indicating that a glasses detector of the counterpart TV receiver detects that a counterpart user wears 3D glasses, the controller is configured to start transmitting 3D video to the counterpart TV receiver based on the received meta-information.

4. The system of claim 2, wherein when the controller receives meta-information indicating that the counterpart TV receiver is in the 3D video displayable state and indicating that a glasses detector of the counterpart TV receiver detects that a counterpart user wears 3D glasses, the controller is configured to start transmitting 3D video to the counterpart TV receiver based on the received meta-information.

* * * * *